Figure 1:
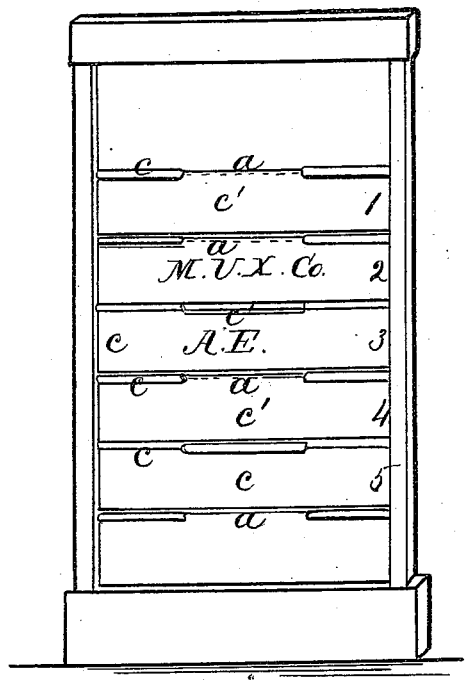

United States Patent Office.

CHARLES H. SEAWELL, OF ST. LOUIS, MISSOURI, ASSIGNOR TO GEORGE F. LEWIS, OF SAME PLACE.

Letters Patent No. 82,756, dated October 6, 1868; antedated September 24, 1868.

IMPROVEMENT IN EXPRESS-SIGNALS.

The Schedule referred to in these Letters Patent and making part of the same.

TO ALL WHOM IT MAY CONCERN:

Be it known that I, CHARLES H. SEAWELL, of St. Louis, Missouri, have invented a new and improved Mode of Constructing an Express-Call, called "Charles H. Seawell's Express-Call;" and I do hereby declare that the following is a full and exact description of the same, reference being had to the annexed drawing, and letters marked thereon.

The nature of my invention consists in constructing a series of double signs, so that the lettered sides may be thrown together and the blank sides out when no call is desired, and the lettered sides out and blank sides together when a call is wished.

To enable others skilled in the art to make and use my invention, I will proceed to a full and exact description of the same.

Figure 1 represents a perspective view of "Charles H. Seawell's Express-Call."

The letter $d$ represents a square or rectangular frame, with the wires $b\ b\ b\ b\ b$ passing through from side to side, on which to hang the sign-boards, which may be made of any metallic substance, and put on the wire similar to a common hinge, as seen at $a\ a\ a\ a\ a$.

$c\ c\ c\ c\ c$ are the front signs, lettered on their front sides with the names of the various companies.

$c'\ c'\ c'\ c'\ c'$ are the rear signs, lettered on their fronts with letters to correspond to the front ones. These pairs, being hung on the wires $b\ b\ b\ b\ b$, can be thrown with their blank sides together and their lettered sides out when a call is needed, and thus they may be seen from both sides of the frame.

When the signs are not to be used, their blank sides are out, as seen in Nos. 1, 4, 5; when they are used, they will appear as seen in Nos. 2, 3.

Of course I do not claim, as new, the signs; but

What I claim, and for which I ask Letters Patent of the United States to be granted me, is—

The signs $c$ and $c'$, placed in pairs on a pivot-wire, $b$, and arranged with calling-signs on one face, but blank on the reverse, so that the call shows on both sides when it shows at all, as described.

C. H. SEAWELL.

Witnesses:
A. J. KNIGHT,
WM. M. ECCLES.